July 27, 1948.  M. F. SKINKER  2,445,805
ENCLOSED RECTIFIER
Filed July 9, 1945

INVENTOR.
Murray F. Skinker
BY
ATTORNEY

Patented July 27, 1948

2,445,805

UNITED STATES PATENT OFFICE 2,445,805

ENCLOSED RECTIFIER

Murray F. Skinker, Montclair, N. J., assignor to Federal Telephone and Radio Corporation, New York, N. Y., a corporation of Delaware Application July 9, 1945, Serial No. 603,933

9 Claims. (Cl. 175—366)

1

The invention relates to rectifier units, and more especially to such units of the stack type.

In areas where there is long-continued humidity, the effectiveness of rectifier units of the selenium or similar types is likely to decrease. The primary object of the present invention is to provide a rectifier stack for use in such climates, as for example in the tropics, which will be sealed so as to prevent the entrance of water vapor, so that the life and efficiency of the unit will be substantially increased.

Another object of the invention is to produce such a device which can be easily made and assembled, so as to be economical to manufacture or repair.

A further object of the invention is to provide in an arrangement of this type adequate heat-dissipating parts so that heat developed within the stack is conducted readily and directly to the outside, despite the sealing of the stack, and is there radiated to the surrounding air.

Further objects and advantages of the invention will appear more fully from the following description, particularly when taken in conjunction with the accompanying drawings which form a part thereof:

Figure 1:
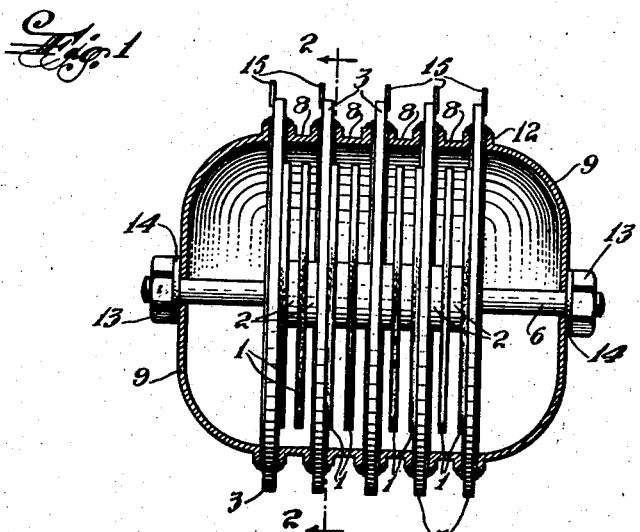
Fig. 1 shows in side elevation, with the container in section, a rectifier stack unit embodying the invention.
Figure 2:
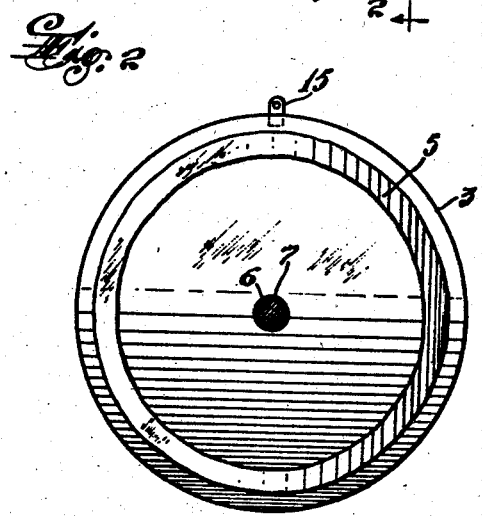
Fig. 2 is a side elevation of one of the lead discs.
Figure 4:
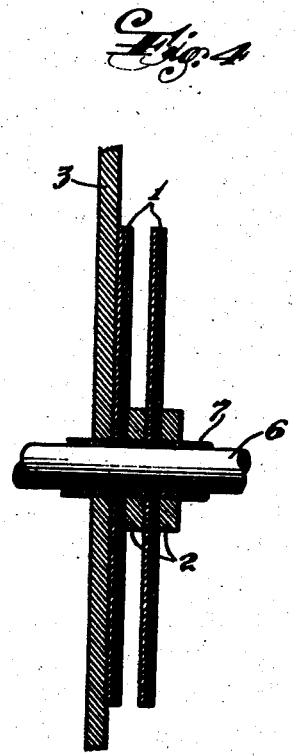
Figs. 3 and 4 are enlarged cross-sections through parts of the device.
Figure 3:
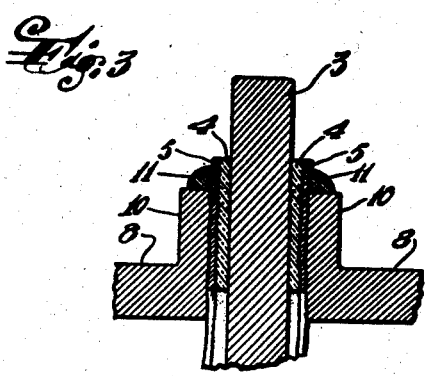

As shown in the drawings, the invention is applied to the construction of a full-wave rectifier unit. This is composed of rectifier elements 1 separated by contact washers 2 and connector plates 3 for making the electrical connections to the rectifier. The rectifier elements 1 in combination with the contact washers 2 have been illustrated as of the so-called "center contact" type, disclosed in the Richards et al. Patent 2,314,104 issued March 16, 1943, although it is obvious that the principles of my construction are equally applicable to the more generally used petal contact rectifier.

The connector plates 3, according to the invention, are in turn larger than the rectifier discs 1. These plates or discs 3 each have an annular thin ring 4 of glass bonded on each face, adjacent but preferably spaced inwardly somewhat from the periphery of the plate. The exposed face of each ring is covered with a thin adhering layer

2

5 of metal, applied to the glass in any suitable manner, as by platenizing, it being understood, of course, that the metal layer 5 is electrically insulated from the plate 3 by the intervening glass ring 4. While the rectifier elements and connector plates are shown as circular in outline other suitable shapes may be used.

The stack is formed by a suitable number of rectifier elements 1, contact washers 2 and connector plates 3. In the example shown in Fig. 1, they are arranged in the form of a full wave bridge rectifier with two rectifier elements in each arm. Each of these has a central opening through which passes a stud or rod 6 which is insulated from the parts by an insulating sleeve 7.

In order to enclose the parts, a container is formed of sleeves 8 and end caps 9. Sleeves 8 have flanges 10 at each end, and fit between successive connector plates 3. Flanges 10 engage the metallized surfaces 5 of the glass rings, and are secured and sealed to the metallized surfaces by solder as at 11, or in any other suitable manner. End caps 9 have similar flanges 12 which engage the outer faces of the two end discs 6 and are soldered thereto.

Rod 6 extends through openings in end caps 9, and has nuts 13 on its ends engaging the end caps. Any suitable fluid-tight gasket, as indicated at 14, may be arranged between the nuts and the end caps.

Such an arrangement is easy to assemble or disassemble, yet is completely air-tight so that no damaging water vapor can reach the rectifier elements. The heat generated is conducted off readily, the lead-off discs 3 preferably extending somewhat beyond the casing so as to form cooling fins to which lead connectors 15 may be attached. These discs simplify the connection of the device in the circuit, since wires or lead connectors may be connected anywhere around their periphery.

In order to assist in the cooling of the rectifier, the fluid-tight housing as described may be filled with a suitable cooling liquid, such as oil.

Although I have shown and described a full-wave rectifier stack, it is clear that the principle of the invention is applicable to other types of rectifier units. I therefore wish it to be clearly understood that, while I have described herein one embodiment of my invention, I do not intend to limit myself thereby except within the scope of the appended claims.

I claim:

1. A rectifier unit that comprises a stack of rectifier elements, metal connector plates between at least some of said elements, intermediate members beween said plates surrounding said elements in spaced relationship thereto and hollow end caps engaging with the end connector plates of the stack forming with the intermediate members and the connector plates a casing hermetically enclosing said elements.

2. A rectifier unit as defined in claim 1 further characterized in that the intermediate members are sealed along their peripheral portions to the adjacent connector plates.

3. In a rectifier unit that comprises a stack of rectifier elements, a hermetically sealed casing about said elements that comprises at least 2 metal connector plates electrically connected to said rectifier elements and positioned therebetween, localized areas of non-conducting vitreous material upon the opposite faces of each of said connector plates, sleeves disposed in spaced relationship to said elements extending between the connector plates and sealed to the vitreous material thereon, and hollow end caps engaging with the end connector plates of the stack sealed to vitreous material adhering to said plates whereby the rectifier elements are hermetically sealed within the casing including said connector plates, sleeves and hollow end caps.

4. A rectifier unit that comprises a stack of rectifier elements, metal connector plates between at least some of said elements, electrically insulating vitreous material coated upon the opposite faces of said plates, a metallic layer upon said vitreous material electrically insulated from said plates by said material, sleeve elements disposed between the metal connector plates surrounding and in spaced relationship to the rectifier elements and hollow end caps engaging with the end connector plates of the stack, said sleeve elements and said end caps being hermetically united to the metal layers on said vitreous material whereby the connector plates, the sleeve elements and the end caps provide hermetically sealed casing around the rectifier elements.

5. A rectifier unit as set forth in claim 3 wherein the metal connector plates extend outside the casing to provide a heat exchange element for abstracting heat from the rectifier elements.

6. A rectifier unit as defined in claim 3 further characterized in that vitreous material on the connector plates occupies areas around peripheral parts of the connector plates in spaced relationship thereto.

7. A rectifier unit comprising a rod, a rectifier element mounted on said rod, at least two metal discs mounted on said rod on opposite sides of said rectifier element and electrically connected thereto, said discs having annular rings of a non-conducting vitreous material adhering to their opposed faces, the exposed surfaces of said rings having metallic coatings adhering thereto, and an annular sleeve between said discs surrounding said element peripherally at a distance and having its peripheral edges soldered to said metallic surfaces, and end caps sealed to the outer faces of said conductor discs to form a hermetically sealed casing.

8. A rectifier unit as claimed in claim 7, in which said rod extends through said end caps and has nuts threaded thereon and engaging the caps, and sealing means between said nuts and said end caps.

9. A rectifier unit as claimed in claim 7, in which said rings are spaced inwardly from the periphery of said discs.

MURRAY F. SKINKER.

REFERENCES CITED

The following references are of record in the file of this patent:

UNITED STATES PATENTS

| Number | Name | Date |
|--------|------|------|
| 1,872,947 | Hengstenberg | Aug. 23, 1932 |
| 1,989,463 | Ruben | Jan. 29, 1935 |
| 2,083,647 | Gilson | June 15, 1937 |
| 2,106,344 | Flegal | Jan. 25, 1938 |
| 2,126,765 | Freeman | Aug. 16, 1938 |
| 2,247,753 | Hansell | July 1, 1941 |